(12) United States Patent
Horng et al.

(10) Patent No.: US 8,299,675 B2
(45) Date of Patent: Oct. 30, 2012

(54) BRUSHLESS DC MOTOR AND STATOR THEREOF

(75) Inventors: Alex Horng, Kaohsiung (TW); Tso-Kuo Yin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 383 days.

(21) Appl. No.: 12/726,407

(22) Filed: Mar. 18, 2010

(65) Prior Publication Data

US 2010/0308683 A1 Dec. 9, 2010

(30) Foreign Application Priority Data

Jun. 9, 2009 (TW) .............................. 98119199 A

(51) Int. Cl.
*H02K 1/00* (2006.01)
(52) U.S. Cl. ...................................................... 310/194
(58) Field of Classification Search .................. 310/194, 310/180, 179, 208, 91
See application file for complete search history.

(56) References Cited

U.S. PATENT DOCUMENTS

| | | | | |
|---|---|---|---|---|
| 3,308,319 A | * | 3/1967 | Faulhaber et al. | ....... 310/154.04 |
| 4,019,075 A | * | 4/1977 | Kagami | ......................... 310/206 |
| 4,123,679 A | * | 10/1978 | Miyasaka | ...................... 310/266 |
| 4,564,781 A | * | 1/1986 | Arnegger | ...................... 310/208 |
| 5,939,807 A | | 8/1999 | Patyk et al. | |
| 5,973,424 A | | 10/1999 | Engelberger et al. | |
| 6,320,294 B1 | | 11/2001 | Kliman | |
| 6,507,991 B1 | * | 1/2003 | Ozawa et al. | .................... 29/596 |
| 7,323,835 B2 | | 1/2008 | Hazelton et al. | |
| 7,525,230 B1 | * | 4/2009 | Gabrys | .......................... 310/179 |
| 2007/0200452 A1 | * | 8/2007 | Graham et al. | ................ 310/266 |

* cited by examiner

*Primary Examiner* — Nguyen N Hanh
(74) *Attorney, Agent, or Firm* — Alan Kamrath; Kamrath IP Lawfirm, PA

(57) ABSTRACT

A stator for a brushless DC motor includes a cylindrical member and a positioning member. The cylindrical member is formed by a plurality of metal wires. Each metal wire includes two ends each forming a terminal. The cylindrical member includes first and second ends separated along a longitudinal axis. The positioning member includes an annular body received in the first end of the cylindrical member and separated from the second end of the cylindrical member along the longitudinal axis. The positioning member maintains a shape of the cylindrical member. The stator can be mounted in a space defined by a housing and a base engaged with the housing, forming a brushless DC motor. A bearing and a circuit board are mounted in the space. The bearing rotatably supports a shaft. A permanent magnet is mounted to the shaft and aligned with the stator.

14 Claims, 6 Drawing Sheets

BRUSHLESS DC MOTOR AND STATOR THEREOF

BACKGROUND OF THE INVENTION

1. Field of the Invention

The present invention relates to a brushless DC motor and a stator of the brushless DC motor and, more particularly, to a brushless DC motor including a stator comprised of a positioning member and a plurality of metal wires wound around the positioning member.

2. Description of the Related Art

FIG. 1 shows a conventional stator 9 for a brushless DC motor. The stator 9 is formed by placing a sleeve 92 on a shaft of a coil-winding device, and metal wires 91 are wound around the sleeve 92 such that the metal wires 91 have a predetermined, generally cylindrical, shape. After winding of the metal wires 91, the sleeve 92 and the metal wires 91 are removed from the shaft of the coil-winding device and together form a stator 9 including a plurality of terminals 93 for electrical connection purposes. The stator 9 can be utilized as a stator for a motor.

Generally, the stator 9 of this type requires a sleeve 92 allowing winding the metal wires 91 and maintaining the predetermined shape. However, the sleeve 92 serves no other purpose than allowing winding of the metal wires 91 and maintaining the predetermined shape.

SUMMARY OF THE INVENTION

An objective of the present invention is to provide a stator for a brushless DC motor that is easy to manufacture.

Another objective of the present invention is to provide a stator for a brushless DC motor that has a simple structure.

A further objective of the present invention is to provide a stator for a brushless DC motor that can be directly fixed in a predetermined location, allowing easy assembly of the stator.

Still another objective of the present invention is to provide a stator for a brushless DC motor including terminals that can be reliably fixed to prevent the terminals from being damaged by pulling.

Yet another objective of the present invention is to provide a stator for a brushless DC motor including fixed terminals for electrical connection, allowing easy assembly of the stator.

Still another objective of the present invention is to provide a brushless DC motor including the above stator and, thus, having the above advantages.

A stator for a brushless DC motor according to the preferred teachings of the present invention includes a cylindrical member and a positioning member. The cylindrical member is formed by a plurality of metal wires. Each of the plurality of metal wires includes two ends each forming a terminal. The cylindrical member includes first and second ends separated along a longitudinal axis. The positioning member includes an annular body received in the first end of the cylindrical member and separated from the second end of the cylindrical member along the longitudinal axis. The positioning member maintains a shape of the cylindrical member formed by the plurality of metal wires.

A brushless DC motor according to the preferred teachings of the present invention includes a housing, a stator, and a base. The stator includes a cylindrical member and a positioning member. The cylindrical member is formed by a plurality of metal wires. Each of the plurality of metal wires includes two ends each forming a terminal. The cylindrical member includes first and second ends separated along a longitudinal axis. The positioning member includes an annular body received in the first end of the cylindrical member and separated from the second end of the cylindrical member along the longitudinal axis. The positioning member maintains a shape of the cylindrical member formed by the plurality of metal wires. The base is engaged with the housing to define a space. At least one bearing and a circuit board are mounted in the space. The at least one bearing rotatably supports a shaft. A permanent magnet is mounted to the shaft and aligned with the stator.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
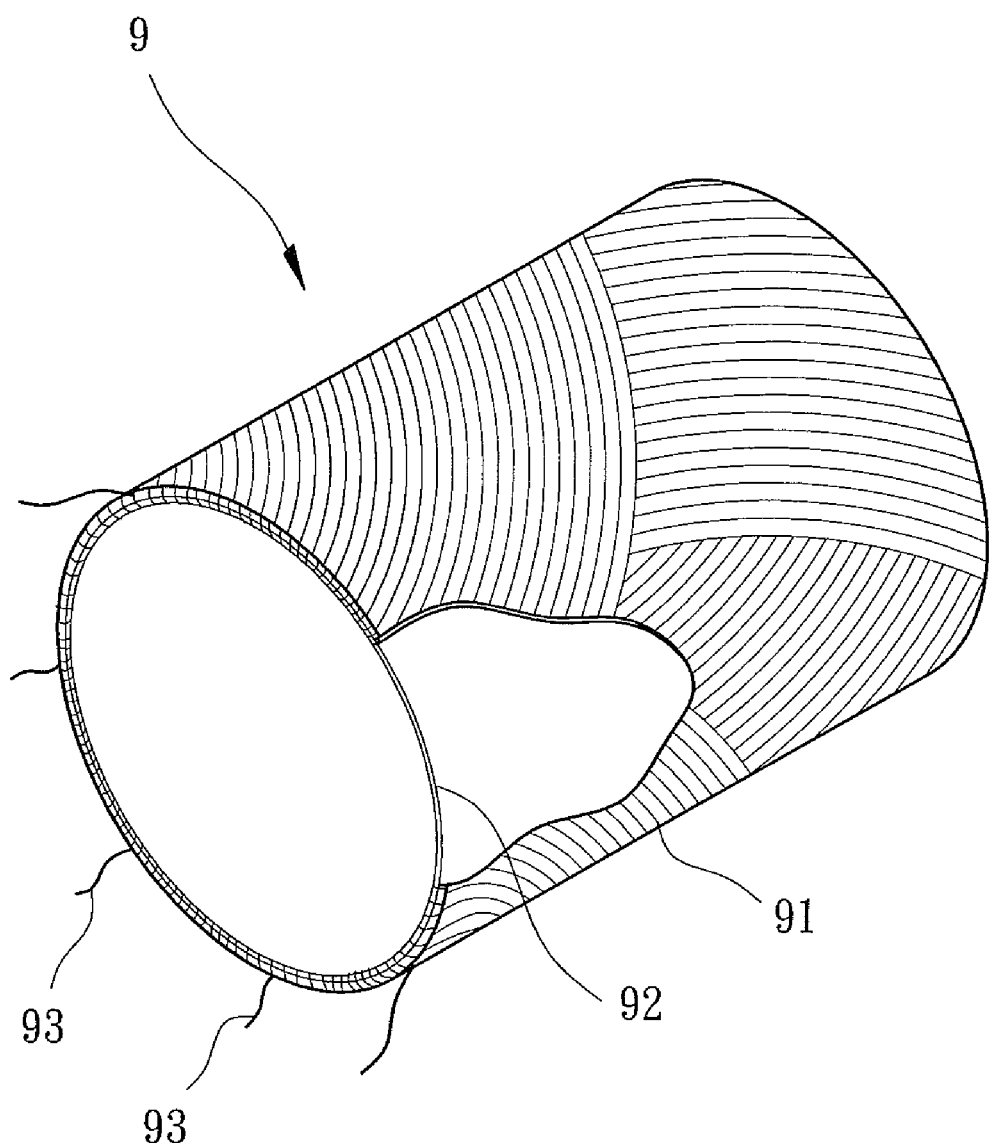
FIG. 1 shows a perspective view of a conventional stator for a brushless DC motor.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "inner", "outer", "end", "portion", "longitudinal", "radial", "annular", "length", "thickness", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
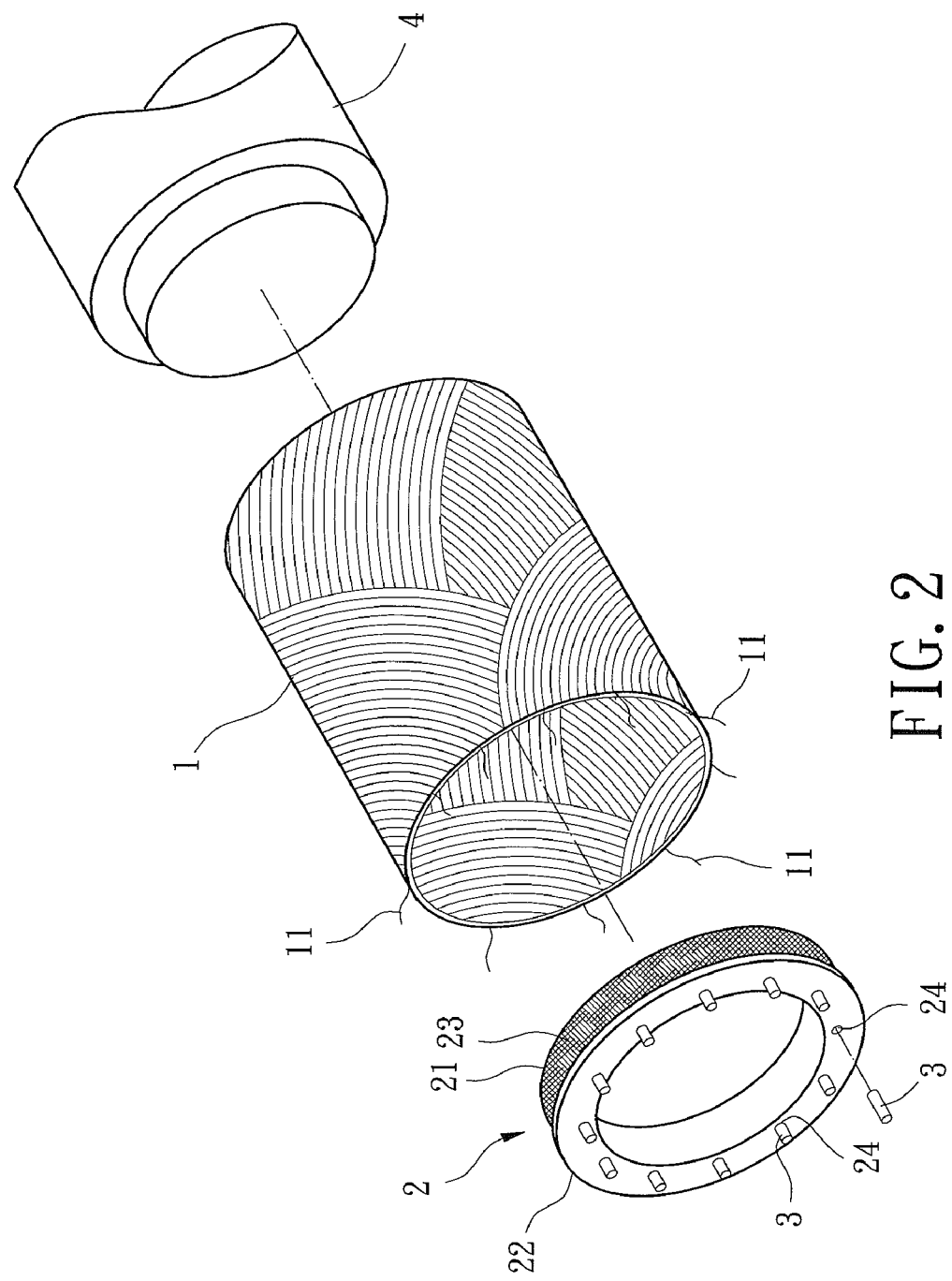
FIG. 2 shows an exploded perspective view of a first example of a stator for a brushless DC motor according to the preferred teachings of the present invention and a portion of a winding die for forming the stator.
Figure 3:
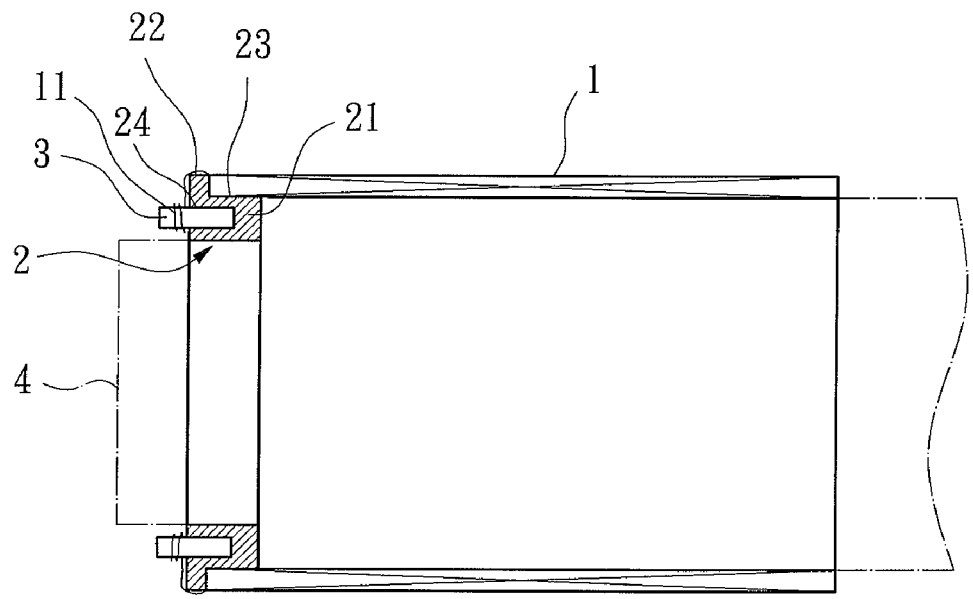
FIG. 3 shows a cross sectional view of the stator and the winding die of FIG. 2.

FIGS. 2 and 3 show a first example of a stator for a brushless DC motor according to the preferred teachings of the present invention. A positioning member 2 is mounted on a winding die 4 of a coil-winding device. The positioning member 2 has an outer periphery flush with an outer periphery of the winding die 4. A plurality of wires 1 is wound around the outer peripheries of the positioning member 2 and the winding die 4 according to a predetermined desired number of poles and a predetermined number of turns.

Each metal wire 1 includes a beginning and an end, with the beginning and end forming a terminal 11 for electric connection purposes, respectively.

The positioning member 2 includes an annular body 21 and a flange 22 formed on an end of the annular body 21. The positioning member 2 has appropriate thickness and length such that the outer periphery of the positioning member 2 is flush with the outer periphery of the winding die 4 when the positioning member 2 is mounted on the winding die 4. Thus, after the metal wires 1 are wound around the outer peripheries of the annular body 21 of the positioning member 2 and the winding die 4 according to the predetermined number of poles and the predetermined number of turns to form a cylindrical stator, the positioning member 2 can maintain the metal wires 1 in the cylindrical shape with the annular body 21 of the positioning member 2 merely located in an end of the cylindrical stator. It can be appreciated that the metal wires 1 form a cylindrical member which is hollow and has first and second ends separated along a longitudinal axis. The annular body 21 of the positioning member 2 is received in the first end of the cylindrical member and separated from the second end of the cylindrical member along the longitudinal axis. The flange 22 formed on the end of the annular body 21 protrudes in a radial direction perpendicular to the longitudinal axis to limit the metal wires 1.

In this example, the outer periphery of the annular body 21 includes a slightly rugged surface 23 with a pattern. The material of the slightly rugged surface 23 is properly chosen such that it will not cause damage to the insulating layers of the metal wires 1. Thus, enhanced engaging effect is provided between the metal wires 1 and the positioning member 2 when the metal wires 1 are wound around the outer periphery of the annular body 21. The enhanced engaging effect between the metal wires 1 and the positioning member 2 avoids the metal wires 1 from falling from the outer periphery of the annular body 21 of the positioning member 2 while removing the metal wires 1 and the positioning member 2 from the outer periphery of the winding die 4.

A plurality of engaging members 3 in the form of pins or pegs protrudes from a face of the positioning member 2. The positioning member 2 can include a plurality of positioning holes 24 in an end face of the end of the annular body 21, and the engaging members 3 can be fixed in the positioning holes 24. However, the engaging members 3 can be integrally formed with the positioning member 2 as a single continuous monolithic piece. The engaging members 3 are made of material with appropriate strength, such that the cylindrical stator comprised of the metal wires 1 and the positioning member 2 can be directly fixed to a predetermined location of a motor housing or circuit board through the engaging members 3. Furthermore, the terminals 11 of the metal wires 1 wound around the outer periphery of the annular body 21 can wind around the engaging members 3 to fix the terminals 11, preventing the terminals 11 from being damaged by pulling. Further, the engaging members 3 can be made of electrically conductive material for electric connection purposes.

Figure 4:
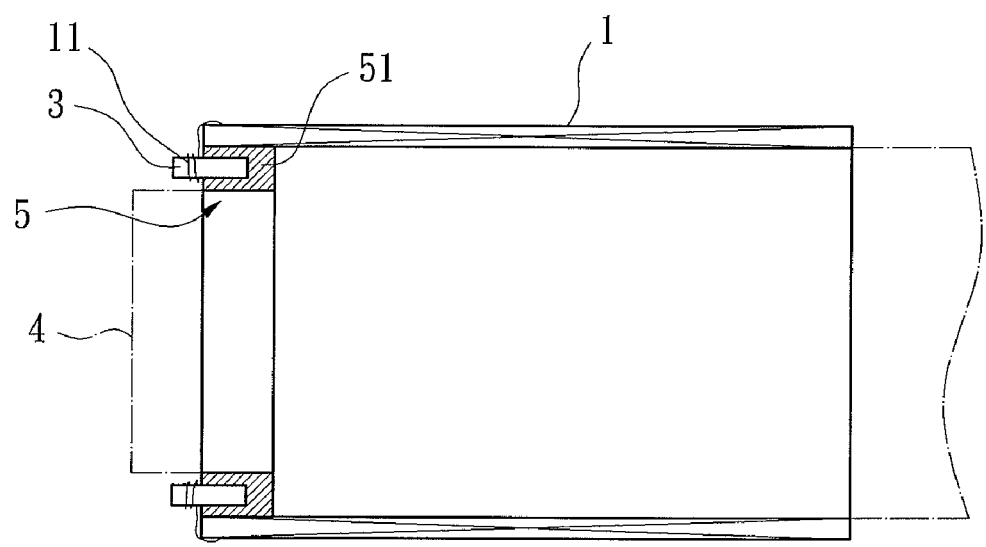
FIG. 4 shows a cross sectional view of a second example of the stator according to the preferred teachings of the present invention and a portion of a winding die for forming the stator.

FIG. 4 shows a second example of the positioning member 5 according to the preferred teachings of the present invention. The positioning member 5 includes an annular body 51 having a uniform inner diameter and a uniform outer diameter. The outer periphery of the positioning member 5 is flush with the outer periphery of the winding die 4 when the positioning member 5 is mounted on the winding die 4. Thus, after the metal wires 1 are wound around the outer peripheries of the annular body 51 of the positioning member 5 and the winding die 4 according to the predetermined number of poles and the predetermined number of turns to form a cylindrical stator, the positioning member 5 can maintain the metal wire 1 in the cylindrical shape with the annular body 51 of the positioning member 5 merely located in an end of the cylindrical stator. In this example, the outer periphery of the annular body 51 can include a slightly rugged surface with a pattern as well as engaging members 3 fixed to a face of the positioning member 5, providing the same advantages as the first example.

Figure 5:
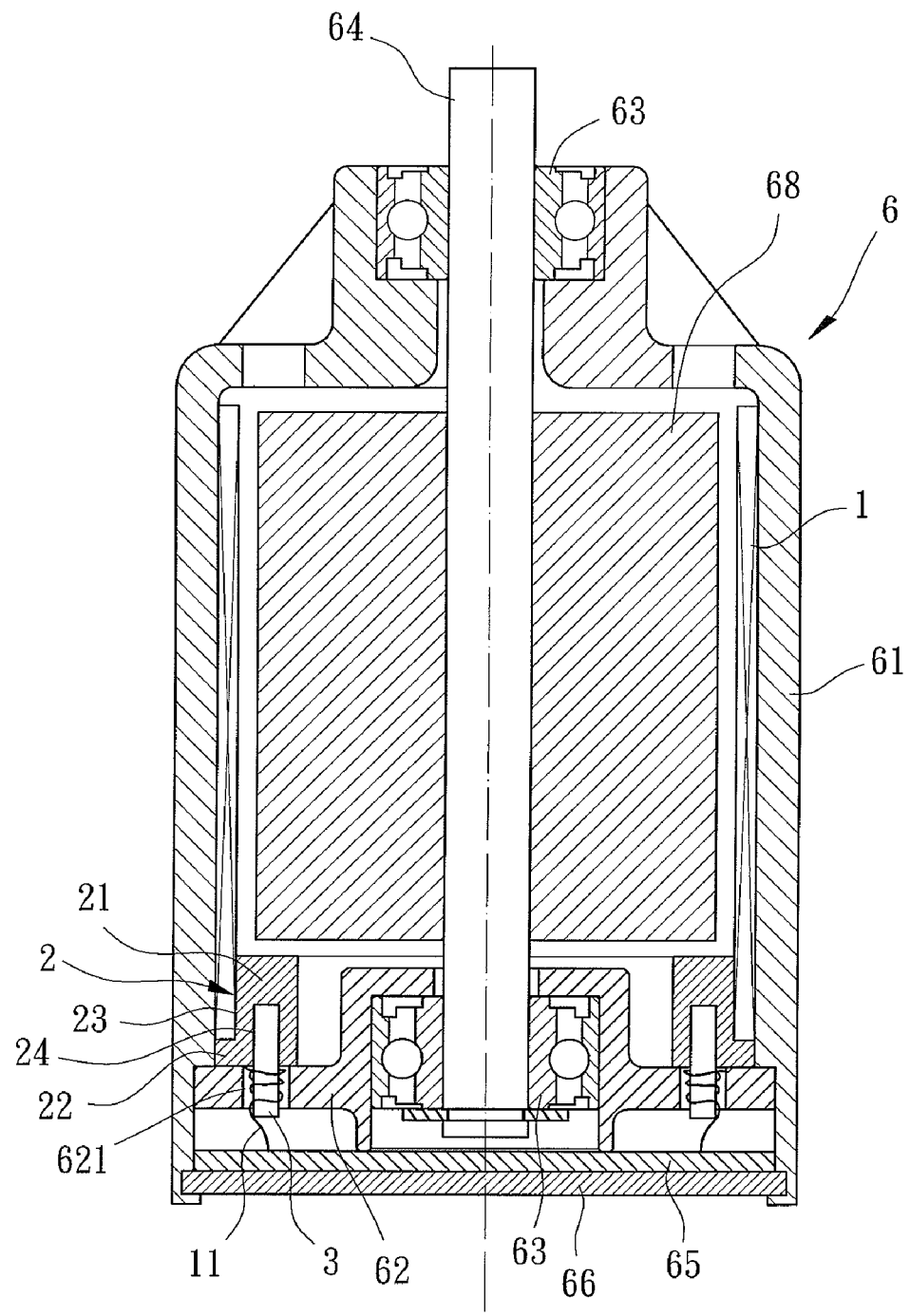
FIG. 5 shows a cross sectional view of a first example of a brushless DC motor according to the preferred teachings of the present invention.

FIG. 5 shows a first example of use of the stator according to the preferred teachings of the present invention in a motor 6. The motor 6 includes a housing 61 and a base 62 engaged with the housing 61 to define a space. Bearings 63 are mounted in the housing 61 and the base 62 to rotatably support a shaft 64. A permanent magnet 68 is mounted to the shaft 64 and aligned with the stator including the metal wires 1. The base 62 includes a plurality of positioning holes 621 into which the engaging members 3 of the cylindrical stator are fixed. The terminals 11 are wound around the engaging member 3 and in electrical connection with a circuit board 65. If necessary, the motor 6 can include a cover 66 to protect the circuit board 65.

Figure 6:
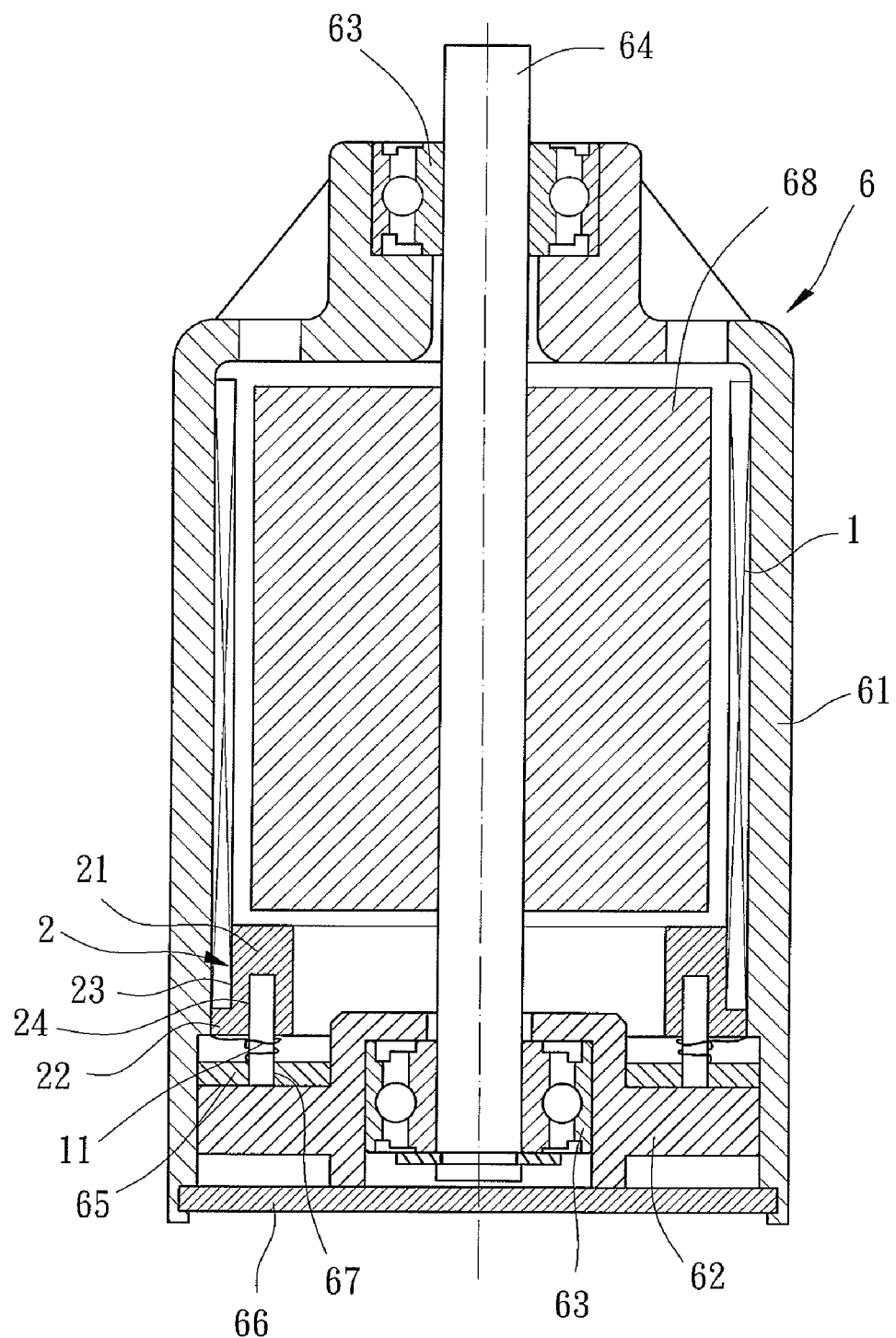
FIG. 6 shows a cross sectional view of a second example of the brushless DC motor according to the preferred teachings of the present invention.

FIG. 6 shows a second example of use of the stator in a motor 6 according to the preferred teachings of the present invention. The motor 6 includes a housing 61 and a base 62 engaged with the housing 61 to define a space. Bearings 63 are mounted in the housing 61 and the base 62 to rotatably support a shaft 64. A permanent magnet 68 is mounted to the shaft 64 and aligned with the stator including the metal wires 1. A circuit board 65 is mounted to the base 62 and includes a plurality of electrically conductive holes 67. The terminals 11 of the metal wires 1 of the stator are directly fixed to the engaging members 3. The engaging members 3 are directly fixed in the electrically conductive holes 67 of the circuit board 65 for electric connection purposes. The motor 6 can further include a cover 66 to protect the circuit board 65.

Figure 7:
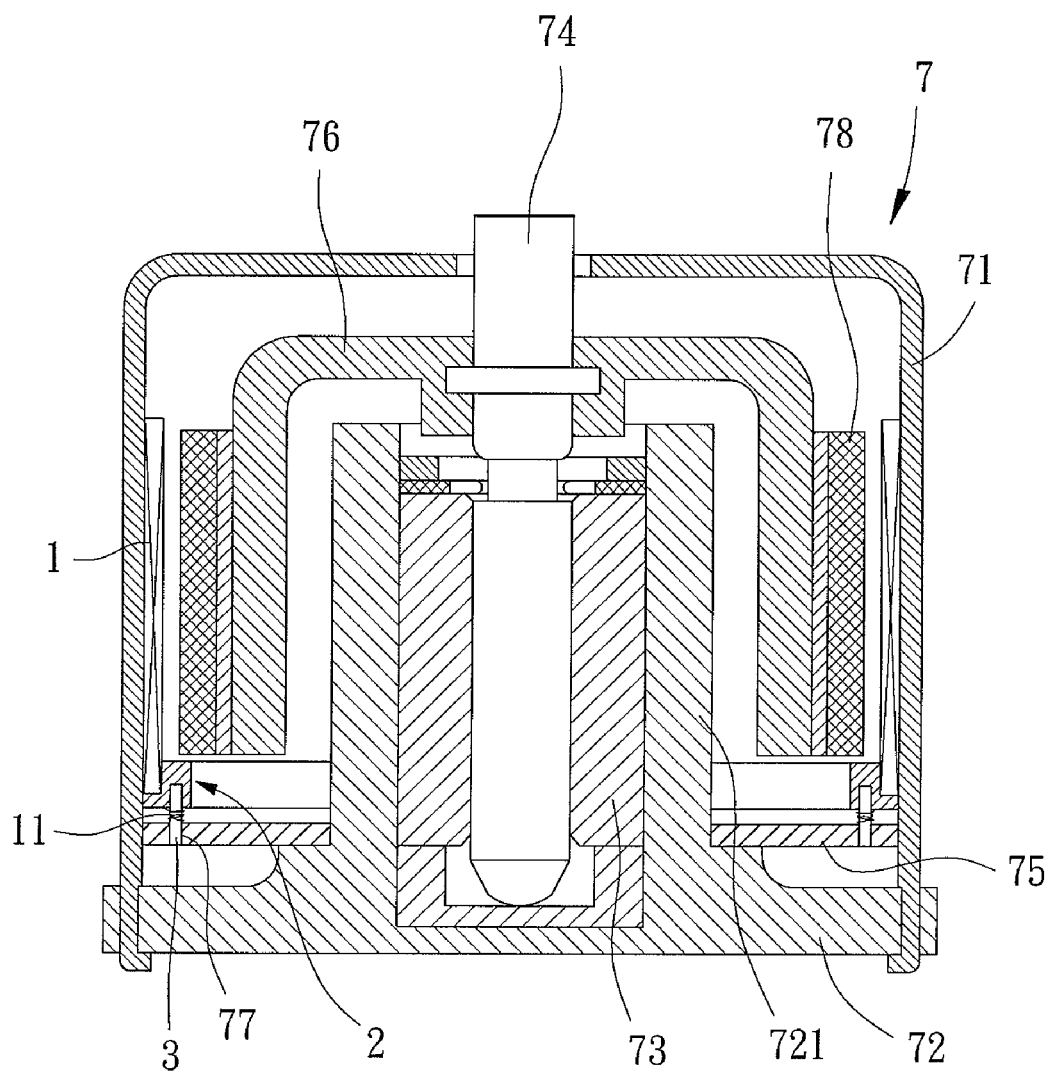
FIG. 7 shows a cross sectional view of a third example of the brushless DC motor according to the preferred teachings of the present invention.

FIG. 7 shows a third example of use of the stator in a motor 7 according to the preferred teachings of the present invention. The motor 7 includes a housing 71 and a base 72 engaged with the housing 71 to define a space. The base 72 includes a shaft tube 721 receiving a bearing 73 for rotatably supporting a shaft 74. The shaft 74 is engaged with a hub 76. A permanent magnet 78 is mounted to an outer periphery of the hub 76 and aligned with the stator having the metal wires 1. A circuit board 75 is mounted to the base 72 and includes a plurality of electrically conductive holes 77. The terminals 11 of the metal wires 1 of the stator are directly fixed to the engaging members 3. The engaging members 3 are directly fixed in the electrically conductive holes 77 of the circuit board 75 for electric connection purposes.

The stator according to the preferred teachings of the present invention is formed by: (1) placing a positioning member on a winding die 4 of a coil-winding device, with the outer periphery of the positioning member 2, 5 flush with the outer periphery of the winding die 4, and (2) winding a plurality of metal wires around the outer peripheries of the positioning member 2, 5 and the winding die 4, with the positioning member 2, 5 merely located in an end of the cylindrical stator. Thus, the stator according to the preferred teachings of the present invention is easy to manufacture.

The stator according to the preferred teachings of the present invention has a simple structure, because the metal wires 1 of the stator according to the preferred teachings of the present invention are directly wound around the positioning member 2, 5 that maintains the wound metal wires 1 in a predetermined cylindrical shape.

The stator according to the preferred teachings of the present invention is formed by winding the metal wires 1 around the positioning member 2, 5 maintaining the wound metal wires 1 in a predetermined cylindrical shape. Therefore, a simple structure of the stator is achieved.

In addition to directly winding the metal wires 1 around the positioning member 2, 5 maintaining the wound metal wires 1 in a predetermined cylindrical shape, the positioning member 2, 5 includes a plurality of engaging members 3 that can be directly fixed in a predetermined location, allowing easy assembly of the stator according to the preferred teachings of the present invention.

The stator according to the preferred teachings of the present invention is comprised of the metal wires 1 and the positioning member 2, 5 that can include engaging members 3 for fixing the terminals 11, preventing the terminals 11 from being damaged by pulling.

The stator according to the preferred teachings of the present invention is comprised of the metal wires 1 and the positioning member 2, 5 that can include engaging members 3 made of electrically conductive material for electric connection purposes. Thus, the stator for a brushless DC motor according to the preferred teachings of the present invention can be assembled more easily.

The above stator can be mounted in a space formed by a housing 61 and a base 62. Based on this, a plurality of bearings 63, a shaft 64, a circuit board 65 and a permanent magnet 68 can be assembled in the space formed by the housing 61 and the base 62 to form a brushless DC motor including the above stator and, thus, having the above objectives.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A stator for a brushless DC motor comprising:
    a cylindrical member formed by a plurality of metal wires, with each of the plurality of metal wires including two ends each forming a terminal, with the cylindrical member including first and second ends separated along a longitudinal axis; and
    a positioning member including an annular body received in the first end of the cylindrical member, with the annular body separated from the second end of the cylindrical member along the longitudinal axis, with the positioning member maintaining a shape of the cylindrical member formed by the plurality of metal wires, with the positioning member including a face, and with a plurality of engaging members protruding from the face of the positioning member.

2. The stator for the brushless DC motor as claimed in claim 1, with the annular body of the positioning member including an end, and with the end of the annular body including a flange protruding in a radial direction perpendicular to the longitudinal axis.

3. The stator for the brushless DC motor as claimed in claim 1, with the terminals of the plurality of metal wires wound around the plurality of engaging members.

4. The stator for the brushless DC motor as claimed in claim 1, with the plurality of engaging members made of electrically conductive material.

5. The stator for the brushless DC motor as claimed in claim 1, with the positioning member including a plurality of positioning holes, and with the plurality of engaging members fixed in the plurality of positioning holes.

6. The stator for the brushless DC motor as claimed in claim 1, with the plurality of engaging members integrally formed with the positioning member as a single continuous monolithic piece.

7. A stator for a brushless DC motor comprising:
    a cylindrical member formed by a plurality of metal wires, with each of the plurality of metal wires including two ends each forming a terminal, with the cylindrical member including first and second ends separated along a longitudinal axis; and
    a positioning member including an annular body received in the first end of the cylindrical member, with the annular body separated from the second end of the cylindrical member along the longitudinal axis, with the positioning member maintaining a shape of the cylindrical member formed by the plurality of metal wires, with the outer periphery of the annular body including a slightly rugged surface.

8. The stator for the brushless DC motor as claimed in claim 7, with the annular body of the positioning member including an end, and with the end of the annular body including a flange protruding in a radial direction perpendicular to the longitudinal axis.

9. A brushless DC motor comprising:
    a housing;
    a stator including a cylindrical member and a positioning member, with the cylindrical member formed by a plurality of metal wires, with each of the plurality of metal wires including two ends each forming a terminal, with the cylindrical member including first and second ends separated along a longitudinal axis, with the positioning member including an annular body received in the first end of the cylindrical member, with the annular body separated from the second end of the cylindrical member along the longitudinal axis, with the positioning member maintaining a shape of the cylindrical member formed by the plurality of metal wires; and
    a base engaged with the housing to define a space, with at least one bearing and a circuit board mounted in the space, with said at least one bearing rotatably supporting a shaft, with a permanent magnet mounted to the shaft and aligned with the stator.

10. The brushless DC motor as claimed in claim 9, with the positioning member including a face, and with a plurality of engaging members protruding from the face of the positioning member.

11. The brushless DC motor as claimed in claim 10, with the terminals of the plurality of metal wires wound around the plurality of engaging members.

12. The brushless DC motor as claimed in claim 10, with the plurality of engaging members made of electrically conductive material.

13. The brushless DC motor as claimed in claim 12, with the circuit board including a plurality of electrically conductive holes, and with the plurality of engaging members fixed in the plurality of electrically conductive holes.

14. The brushless DC motor as claimed in claim 10, with the base including a plurality of positioning holes, and with the plurality of engaging members fixed in the plurality of positioning holes.

* * * * *